US008693381B2

(12) United States Patent
Zhang et al.

(10) Patent No.: US 8,693,381 B2
(45) Date of Patent: Apr. 8, 2014

(54) METHOD AND SYSTEM FOR DISCONTINUOUS RECEPTION (DRX) CONFIGURATION

(75) Inventors: Jian Zhang, Shenzhen (CN); Yincheng Zhang, Shenzhen (CN); Guanzhou Wang, Shenzhen (CN); Si Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 83 days.

(21) Appl. No.: 13/496,639

(22) PCT Filed: Aug. 31, 2010

(86) PCT No.: PCT/CN2010/076507
§ 371 (c)(1),
(2), (4) Date: Mar. 16, 2012

(87) PCT Pub. No.: WO2011/038625
PCT Pub. Date: Apr. 7, 2011

(65) Prior Publication Data
US 2012/0176950 A1 Jul. 12, 2012

(30) Foreign Application Priority Data
Sep. 30, 2009 (CN) .......................... 2009 1 0235287

(51) Int. Cl.
*G08C 17/00* (2006.01)
(52) U.S. Cl.
USPC ........................................................ 370/311
(58) Field of Classification Search
None
See application file for complete search history.

(56) References Cited

U.S. PATENT DOCUMENTS

| 8,451,798 | B2* | 5/2013 | Chen | 370/331 |
| 2010/0034127 | A1* | 2/2010 | Iwamura et al. | 370/311 |
| 2010/0130137 | A1* | 5/2010 | Pelletier et al. | 455/68 |
| 2010/0272017 | A1* | 10/2010 | Terry et al. | 370/328 |
| 2011/0002281 | A1* | 1/2011 | Terry et al. | 370/329 |

(Continued)

FOREIGN PATENT DOCUMENTS

CN 101505538 A 8/2009

OTHER PUBLICATIONS

ZTE, Anchor carrier based DRX operation, 3GPP TSG RAN WG2 #67bis, R2-095670.
Motorola, DRX in LTE-A, 3GPP TSG RAN2 #67, R2-094736.

(Continued)

*Primary Examiner* — Anh-Vu Ly
*Assistant Examiner* — Gustavo Lopez-Vargas
(74) *Attorney, Agent, or Firm* — Ling Wu; Stephen Yang; Ling and Yang Intellectual Property

(57) ABSTRACT

A method for discontinuous reception (DRX) configuration is disclosed, and the method includes: configuring DRXs for a plurality of component carriers, and selecting one or more component carriers as anchor component carriers; controlling the DRXs of other non-anchor component carriers by the anchor component carrier. A system for discontinuous reception (DRX) configuration is also disclosed, and the system includes: a selection and configuration unit, which is used to configure DRXs for a plurality of component carriers and select one or more component carriers as anchor component carriers; a control unit, which is used to control the DRXs of other non-anchor component carriers by the anchor component carrier. By the method and the system, the DRX solution based on the primary carrier is clarified, and the DRX solution based on primary carriers in the stage of conception is improved and concretely implemented.

12 Claims, 2 Drawing Sheets

(56) References Cited

U.S. PATENT DOCUMENTS

| | | | |
|---|---|---|---|
| 2011/0003555 A1* | 1/2011 | Guo | 455/67.11 |
| 2011/0294491 A1* | 12/2011 | Fong et al. | 455/422.1 |
| 2013/0003633 A1* | 1/2013 | Kim et al. | 370/311 |
| 2013/0021935 A1* | 1/2013 | Chun et al. | 370/252 |
| 2013/0163550 A1* | 6/2013 | Marinier et al. | 370/329 |

OTHER PUBLICATIONS

ITRI, Discussion of DRX in Carrier Aggregation, 3GPP TSG-RAN WG2 #67bis, R2-094908.

International Search Report for PCT/CN2010/076507 dated Nov. 15, 2010.

* cited by examiner

METHOD AND SYSTEM FOR DISCONTINUOUS RECEPTION (DRX) CONFIGURATION

TECHNICAL FIELD

The present invention relates to the field of communication, and in particular, to a method and system for multi-carrier DRX (Discontinuous Reception) configuration.

BACKGROUND ART

The third-generation mobile communication LTE (Long Term Evolution) system is composed of an E-UTRAN (Evolved Universal Terrestrial Radio Access Network), a UE (User Equipment), and an EPC (Evolved Packet Core). Wherein, the E-UTRAN is composed of Enhanced node B (eNB), and may be also called as an eNB; the UE may be also called as a terminal; the EPC includes a Mobility Management Entity (MME), a Packet Data Gateway (P-GW), and a Service Gateway (S-GW).

In a LTE system, in order to save the battery/power consumption of the UE, the eNB may configure a DRX function for the UE through the Radio Resource Control (RRC) protocol so as to control the activity or act of monitoring the a PDCCH (Physical Downlink Control Channel) of the UE. In a state of radio resource control connection, if DRX is configured, the UE is allowed to monitor the PDCCH discontinuously; otherwise, the UE monitors the PDCCH continuously. The RRC configures timers and related parameters required by the DRX operation, and the timers and related parameters include a duration timer; a DRX inactivity timer; a DRX retransmission timer, which is configured for each downlink HARQ (Hybrid Automatic Repeat Request) procedure except the downlink HARQ procedure specified for receiving the Broadcast Control Channel; long DRX cycle; a DRX initial offset value. Optionally, there are also a DRX short cycle timer and short DRX cycle. Each downlink HARQ procedure, except the downlink HARQ procedure specified for receiving the Broadcast Control Channel, is further configured with a HARQ Round-trip Time (RTT) timer.

In order to describe the DRX act of the UE, a concept of PDCCH sub-frame is introduced. For a UE working in a FDD (Frequency Divided Duplex) mode, the PDCCH sub-frame can represent any sub-frame; for a UE working in a TDD (Time Divided Duplex) mode, the PDCCH sub-frame only refers to downlink sub-frames and special sub-frames containing DwPTS.

Activity time refers to the time when the UE monitors the PDCCH in the PDCCH sub-frame.

Media access control contention resolution timer refers to the number of continuous PDCCH sub-frames of the PDCCH that the UE should monitor after the UE transmits a message 3 (Msg3) of a random access process.

DRX cycle means that periodic repetition of the duration accompanied by a period of possible inactivity time.

DRX inactivity timer defines the number of continuous PDCCH sub-frames after the UE successfully decodes the PDCCH, indicating that there is initial uplink or downlink user data transmission of the UE.

DRX retransmission timer defines the maximum number of continuous PDCCH sub-frames when the UE initially expect for the downlink retransmission.

DRX short cycle timer defines the number of continuous sub-frames when the UE conforms to short DRX cycle.

HARQ RTT timer defines the minimum number of sub-frames before the downlink HARQ retransmission expected by the UE.

Duration timer defines the number of continuous PDCCH sub-frames at the beginning of DRX cycle.

FIG. 1 illustrates the basic working principle of DRX in the existing LTE system: when DRX cycle is configured, the activity time of the UE includes the time when the duration timer, or DRX inactivity timer, or DRX retransmission timer, or media access control contention resolution timer operates; or the time when the SR (Scheduling Request) transmitted on the physical uplink control channel (PUCCH) is pending, i.e., the time of waiting for uplink grant (UL Grant) when the UE transmits the SR; or the time of possible occurrence for assigning UL Grant to the pending HARQ retransmission when there are data in the corresponding HARQ buffer area; or after successfully receiving a random access response message for explicitly transmitted random access preamble, the UE does not receive the indication of the PDCCH that there is new transmission for the cell radio network temporary identifier (C-RNTI) of the UE.

When DRX is configured, the UE executes the following operations in each sub-frame.

If short DRX cycle is used and [(SFN*10)+subframe number] modulo (shortDRX-Cycle)=(drxStartOffset) modulo (shortDRX-Cycle) is met; or if long DRX cycle is used and [(SFN*10)+subframe number] modulo (longDRX-Cycle)=drxStartOffset is met, a duration timer is started in the corresponding sub-frame. For a TDD mode, the duration timer may be started in an uplink sub-frame. Wherein, SFN is the number of the system frames of the recorded sub-frames; subframe number is the number of sub-frames; shortDRX-Cycle is short DRX cycle; drxStartOffset is the initial offset of DRX; longDRX-Cycle is long DRX cycle.

If time is out in the sub-frame and the data in the corresponding HARQ procedure soft buffer area are not successfully decoded, a DRX retransmission timer is started for the corresponding HARQ procedure.

If a DRX command media access control element (DRX command MAC CE) is received, the duration timer is stopped; the DRX inactivity timer is stopped.

If the DRX inactivity timer times out in the sub-frame or a DRX command MAC CE is received: if short DRX cycle is configured, the DRX short cycle timer is started or restarted, and short DRX cycle is used; otherwise long DRX cycle is used.

If the DRX short cycle timer times out in the sub-frame, long DRX cycle is used. During this period, for PDCCH sub-frames, except the sub-frames operated by half-duplex FDD UE and sub-frames overlapping with measurement gap, the UE needs to execute the following operations:

monitoring PDCCH;

if the PDCCH indicates downlink transmission or there is preconfigured downlink assignment in the sub-frame, starting the HARQ RTT timer for the corresponding HARQ procedure; stopping the DRX retransmission timer for the corresponding HARQ procedure;

if the PDCCH indicates new downlink or uplink transmission, starting or restarting the DRX inactivity timer;

the UE receiving or transmitting a HARQ feedback when needing to receive or transmit the HARQ feedback no matter whether the UE is monitoring the PDCCH or not.

In order to meet the increasing requirement for large-bandwidth and high-speed mobile access, the 3GPP (Third Generation Partnership Projects) puts forwards the LTE-A (Long-Term Evolution advanced) standards. The LTE-A adopts a series of new technologies to expand the frequency domain and spatial domain based on LTE so as to achieve the purpose of improving frequency spectrum utilization ratio and increasing system capacity. Among them, carrier aggregation technology can aggregate two or more component carriers to support wider frequency band, for example, reaching 100 MHz and frequency spectrum aggregation. The UE may receive/transmit data on one or more component carriers simultaneously, and may configure to aggregate component carriers of different numbers and different bandwidths in uplink/downlink. Each component carrier corresponds to one HARQ entity and transmission channel. On each downlink component carrier there is a separate PDCCH for indicating the resource assignment on the present component carrier and resource assignment on other component carriers, there are two cases, downlink resource assignment and uplink grant, and the PDCCH has 0-3 bit for indicating component carrier identifier information. For an extended component carrier, there may be no PDCCH, and its resource assignment is indicated by other component carriers having a PDCCH. In LTE-A carrier aggregation, there may be one component carrier as the serving cell of the UE for providing functions such as synchronization, access, system information and paging; or a plurality of component carriers are used as the serving cells of the UE for providing the above functions, wherein, one serving cell may be configured to be a primary serving cell, which serves as the preferred or primary cell during measurement reference, switching, and random access. In a plurality of component carriers, backward compatibility component carriers, non-backward compatibility component carriers or extended component carriers may be configured. Wherein, the backward compatibility component carriers can provide UE access of a LTE system and a LTE-A system, and provide system messages, synchronization channels, random access resources, physical downlink control channels (PDCCH) and so on. The non-backward compatibility component carriers can provide UE access of a LTE-A system, and provide system messages, synchronization channels, random access resources and so on, and the physical downlink control channel may be configured, or may not be configured but downlink resource assignment or uplink grant is implemented using the PDCCHs of other component carriers. The above two types of component carriers may exist standalone. Extended component carriers, generally existing as resources, may provide some enhancing or extending functions, adopt different control signaling formats, and may provide or may not provide system information, and may be configured or may not be configured with a physical downlink control channel.

Among DRX solutions of carrier aggregation in a LTE-A system, currently there are three basis solutions: 1) consistent DRX for component carriers: all component carriers use a set of DRX configurations, conform to the same DRX act; 2) separate DRX for component carriers: each component carrier is configured with DRX respectively, and its DRX act is independent from others; 3) DRX based on a anchor component carrier: DRX is configured on the anchor component carrier, and DRX configuration or act of other non-anchor component carriers is partially or fully subject to the anchor component carrier. In the above three solutions, the DRX solution based on anchor component carrier and other two DRX solutions are still in conception stage currently, and no specific perfect solution is clarified yet.

SUMMARY OF THE INVENTION

In view of the above, the main purpose of the present invention is to provide a method and system for DRX configuration to improve and specifically implement the DRX solution based on primary carriers in conception stage.

In order to achieve the above purpose, the technical scheme of the present invention is implemented as follows:

a method for discontinuous reception (DRX), comprising: configuring DRXs for a plurality of component carriers, and using one or more component carriers as a anchor component carrier; the anchor component carrier determining DRXs of other related non-anchor component carriers.

Wherein, the anchor component carrier comprises DRX state, which comprises activity state and inactivity state;

the non-anchor component carriers comprise DRX state and dormant state; wherein, the DRX state comprises activity state and inactivity state.

Wherein, the DRX state of the anchor component carrier is configured to support long DRX cycle; optionally, the DRX state of the anchor component carrier is configured to support or not support short DRX cycle; optionally, the non-anchor component carriers are configured to: support or not support long DRX cycle, and when configured not to support long DRX cycle, the DRX state thereof is determined to be in activity state or inactivity state according to a control signaling of the anchor component carrier; wherein, when the DRX state of the anchor component carrier and that of the non-anchor component carriers are configured to support short DRX cycle, intermigration operation between the long DRX cycle and the short DRX cycle is supported.

Wherein, the dormant state is: closed state or de-activating state of the component carrier; the DRX state may be entered after the component carrier is open or activated; being in activity state or inactivity state when entering the DRX state; wherein, the component carrier in the dormant state cannot be scheduled; the component carrier in the dormant state cannot be used for transmitting or receiving data, i.e., not monitoring PDCCH or receiving PDSCH.

Wherein, the method further comprises: configuring a relationship between the anchor component carrier and a cell, wherein, the configuration specifically comprises: associating the anchor component carrier with a serving cell or a primary serving cell in a radio resource control (RRC) connection state.

Wherein, the method further comprises: configuring a relationship between the anchor component carrier and a user equipment (UE), wherein the configuration specifically comprises: corresponding the anchor component carrier to a current UE; configuring the anchor component carrier corresponding to the current UE to be a anchor component carrier or a non-anchor component carrier with respect to other UEs.

Wherein, the method further comprises: configuring a relationship between the anchor component carrier and a channel, wherein, the configuration specifically comprises: the anchor component carrier serving as a backward compatible component carrier or a non-backward compatible component carrier, needing to be configured with a physical downlink control channel (PDCCH);

the configuration relationship between the non-anchor component carrier and a channel specifically comprises: the non-anchor component carrier serving as a backward compatible component carrier or a non-backward compatible component carrier or an extended component carrier, being configured with a PDCCH or not.

Wherein, when a current non-anchor component carrier is not configured with a PDCCH, downlink resource assignment, or uplink grant of the current non-anchor component carrier which is not configured with a PDCCH is instructed through the PDCCH of the anchor component carrier or that of other non-anchor component carriers configured with a PDCCH.

Wherein, the anchor component carrier controlling DRX of the non-anchor component carriers specifically comprises: the anchor component carrier controlling DRX of the non-anchor component carriers through a control signaling or a preset condition.

Wherein, the anchor component carrier achieves control on DRX of the non-anchor component carriers by sending a control signaling from an enhanced Node B (eNB) to the non-anchor component carriers; or, the non-anchor component carriers determine DRX configuration or DRX act of the current non-anchor component carrier according to the DRX configuration or DRX act of the anchor component carrier.

Wherein, the control signaling specifically comprises: a media access control element (MAC CE) or a PDCCH signaling or a RRC signaling; the way of the non-anchor component carrier receiving the control signaling of the eNB from the anchor component carrier further comprises:

receiving the control signaling through the PDCCH on the anchor component carrier, or the PDCCH configured for the current non-anchor component carrier, or the PDCCH configured for other non-anchor component carriers; or, receiving the control signaling through the MAC CE received by the anchor component carrier, or the MAC CE received by the current non-anchor component carrier.

Wherein, the control signaling specifically comprises: a MAC CE or a PDCCH signaling or a RRC signaling; in a state migration scene of intermigration between short DRX cycle and long DRX cycle, the method further comprises: the eNB triggering the state migration in the MAC CE transmitted by the anchor component carrier, which specifically comprises: the anchor component carrier notifying, through the MAC CE transmitted by the eNB, the current non-anchor component carrier to migrate from short DRX cycle to long DRX cycle; or the anchor component carrier notifying, through the MAC CE transmitted by the eNB, the current non-anchor component carrier to migrate from long DRX cycle to short DRX cycle; or the non-anchor component carrier migrating from long DRX cycle to short DRX cycle by starting the DRX inactivity timer when receiving or transmitting data of the present component carrier according to received downlink assignment or uplink grant instructed by the PDCCH of the anchor component carrier, and entering the short DRX cycle when the DRX inactivity timer times out;

or the method further comprises: the eNB triggering the state migration in the MAC CE transmitted by the non-anchor component carrier, which specifically comprises: the eNB transmitting the MAC CE in the current non-anchor component carrier to notify the current non-anchor component carrier to migrate from short DRX cycle to long DRX cycle; or, the eNB transmitting the MAC CE in the current non-anchor component carrier, and notifying the current non-anchor component carrier to migrate from long DRX cycle to short DRX cycle.

Wherein, the eNB notifying the current non-anchor component carrier to trigger state migration specifically comprises: the current non-anchor component carrier achieving intermigration between short DRX cycle and long DRX cycle according to the MAC CE transmitted on the anchor component carrier or the current non-anchor component carrier;

or the current non-anchor component carrier performing intermigration between short DRX cycle and long DRX cycle according to a preset condition; wherein, the preset condition specifically comprises: activity status of a service, or the DRX short cycle timer on the anchor component carrier times out.

Wherein, the control signaling specifically comprises: a MAC CE or a PDCCH signaling or a RRC signaling; in a state migration scene of migrating from a DRX state to a dormant state, the method further comprises: the current non-anchor component carrier migrating from the DRX state to the dormant state according to the MAC CE transmitted on the anchor component carrier or the current non-anchor component carrier; or migrating from the DRX state to the dormant state according to a PDCCH signaling transmitted on the anchor component carrier or the current non-anchor component carrier; or migrating from the DRX state to the dormant state according to a RRC de-activating signaling;

or, the current non-anchor component carrier migrating from the DRX state to the dormant state according to a preset condition; wherein, the preset condition specifically comprises: activity status of a service, or the DRX short cycle timer on the anchor component carrier times out.

Wherein, the control signaling specifically comprises: a MAC CE or a PDCCH signaling or a RRC signaling; in a state migration scene of migrating from a dormant state to a DRX state, the method further comprises: the current non-anchor component carrier migrating from the dormant state to the DRX state according to a PDCCH signaling transmitted on the anchor component carrier.

Wherein, when the anchor component carrier is in short DRX cycle, the current non-anchor component carrier is in short DRX cycle or long DRX cycle or dormant state;

when the anchor component carrier is in long DRX cycle, the current non-anchor component carrier is in long DRX cycle or dormant state.

Wherein, MAC CEs of different uses are indicated by different logic channel identifiers respectively; wherein, states of the MAC CE comprise: entering long DRX cycle, entering short DRX cycle, or entering dormant state.

Wherein, the method further configures a timer of the non-anchor component carrier; the configuration specifically comprises:

further configuring the non-anchor component carrier with a standalone DRX inactivity timer;

or, further configuring the non-anchor component carrier with a standalone DRX inactivity timer, and a duration timer;

or, further configuring the non-anchor component carrier with a standalone DRX inactivity timer, or a duration timer;

or, further configuring the non-anchor component carrier with a DRX short cycle timer, and controlling migration scene between DRX cycles according to the DRX short cycle timer;

or, not further configuring the non-anchor component carrier with a DRX short cycle timer, but the non-anchor component carrier still being able to support short DRX cycle and long DRX cycle as well as intermigration;

or, not further configuring the non-anchor component carrier with a standalone DRX inactivity timer;

or, not further configuring the non-anchor component carrier with a standalone duration timer.

Wherein, in a case where the non-anchor component carrier is configured with the standalone DRX inactivity timer, part or all of other DRX configurations conform to the DRX configuration of the anchor component carrier;

in a case where the non-anchor component carrier is configured with the standalone DRX inactivity timer and duration timer, part or all of other DRX configurations conform to the DRX configuration of the anchor component carrier;

in a case where the non-anchor component carrier is configured with the standalone DRX inactivity timer or duration timer, a value of the DRX inactivity timer or duration timer is smaller than, equal to, or greater than a value of the corresponding timer of the anchor component carrier;

in a case where the non-anchor component carrier is not configured with the standalone DRX inactivity timer, when the DRX inactivity timer of the anchor component carrier is started or restarted, the non-anchor component carrier prolongs its time of activity state correspondingly to be consistent with the anchor component carrier;

in a case where the non-anchor component carrier is not configured with the standalone duration timer, the non-anchor component carrier enters a DRX activity state according to the PDCCH signaling of the anchor component carrier or starting of the duration timer, and automatically enters a DRX inactivity state or a dormant state when the DRX inactivity timer of the anchor component carrier times out or the duration timer times out.

Wherein, the DRX inactivity timer configured for the anchor component carrier and each non-anchor component carrier are independently started or restarted according to scheduling status of the present component carrier respectively.

Wherein, DRX configuration of each non-anchor component carrier keeps consistent or is independent from each other;

when each non-anchor component carrier is configured with a duration timer, a sub-frame where starting of the duration timer is located is aligned with the sub-frame where starting of the duration timer of the anchor component carrier is located;

when the DRX configuration of the non-anchor component carrier comprises a retransmission timer and a Hybrid Automatic Repeat Request (HARQ) Round-trip Time (RTT) timer, the retransmission timer and HARQ RTT timer are configured for each downlink HARQ procedure; values of the retransmission timer and HARQ RTT timer are identical with or different from the value of the corresponding timer of the anchor component carrier.

Wherein, the DRX act of the anchor component carrier further needs to conform to the DRX act and principle in the LTE system, or conforms to other extended functions under the premise of being compatible with the DRX act and principle in the LTE system.

Wherein, the DRX act of the non-anchor component carrier further partially or fully conforms to the DRX act and principle in the LTE system, receives the control signaling of the anchor component carrier, and executes the corresponding DRX act according to the control signaling;

or, the non-anchor component carrier executes an identical DRX act according to the DRX configuration and act of the anchor component carrier;

or, the non-anchor component carrier executes a corresponding DRX act according to a preset condition and according to the DRX configuration and act of the anchor component carrier.

Wherein, the method further comprises a process of the UE and the eNB interacting with the a scheduling request (SR) and response for the SR, which specifically comprises:

when transmitting a SR to the eNB, the UE transmitting the SR on any component carrier configured with special physical uplink control channel (PUCCH) resources or on the anchor component carrier;

after the UE transmits the SR, the anchor component carrier further keeping in an activity state at least until receiving uplink grant or a maximum number of times for transmitting the SR is reached; or all component carriers further keeping in an activity state at least until receiving uplink grant or a maximum number of times for transmitting the SR is reached;

when the eNB responds to the SR sent by the UE, further limiting that uplink grant be transmitted on the anchor component carrier; or transmitting uplink grant on any component carrier in activity state.

A system for discontinuous reception configuration, comprising a selecting and configuring unit, and a controlling unit; wherein, the selecting and configuring unit is used to configure DRX for a plurality of component carriers, and select one or more component carriers as a anchor component carrier;

the controlling unit is used to determine DRXs of other related non-anchor component carriers through the anchor component carrier.

Wherein, the system further comprises: a state controlling unit, which is used to control a sate of the anchor component carrier, which specifically comprises DRX state; wherein, the DRX state comprises activity state and inactivity state;

when the state controlling unit is used to control a state of the non-anchor component carrier, the state specifically comprises DRX state and dormant state; wherein, the DRX state comprises activity state and inactivity state.

Wherein, the system further comprises: a unit for configuring a relationship between the anchor component carrier and a cell, and a unit for configuring a relationship between the anchor component carrier and a UE; wherein, the unit for configuring a relationship between the anchor component carrier and a cell is used to configure association between the anchor component carrier and a serving cell or a primary serving cell in a RRC connection state;

the unit for configuring a relationship between the anchor component carrier and a UE is used to configure the anchor component carrier to correspond to the current UE; configure the anchor component carrier corresponding to the current UE to be a anchor component carrier or a non-anchor component carrier with respect to other UEs.

Wherein, the system further comprises: a unit for configuring a relationship between the anchor component carrier and a channel, and a unit for configuring a relationship between the non-anchor component carrier and a channel; wherein, the unit for configuring a relationship between the anchor component carrier and a channel is used to configure PDCCH when the anchor component carrier serves as a backward compatible component carrier or a non-backward compatible component carrier;

the unit for configuring a relationship between the non-anchor component carrier and a channel is used to configure or not configure PDCCH when the non-anchor component carrier serves as a backward compatible component carrier or a non-backward compatible component carrier or an extended component carrier.

In the present invention, DRX is configured for a plurality of component carriers, and one or more component carriers are selected as anchor component carriers, and the DRX of other related non-anchor component carriers is controlled by the selected anchor component carrier.

By the method and the system, the DRX solution based on anchor carriers are clarified, and the DRX solution based on anchor carriers in the stage of conception are improved and concretely implemented.

SPECIFIC EMBODIMENTS

The basic idea of the present invention is that DRX is configured for a plurality of component carriers, and one or more component carriers are selected as a anchor component carrier, and the DRX of other related non-anchor component carriers is controlled by the selected anchor component carrier.

The embodiments of the technical scheme will be further described in detail below with reference to drawings.

Figure 1:
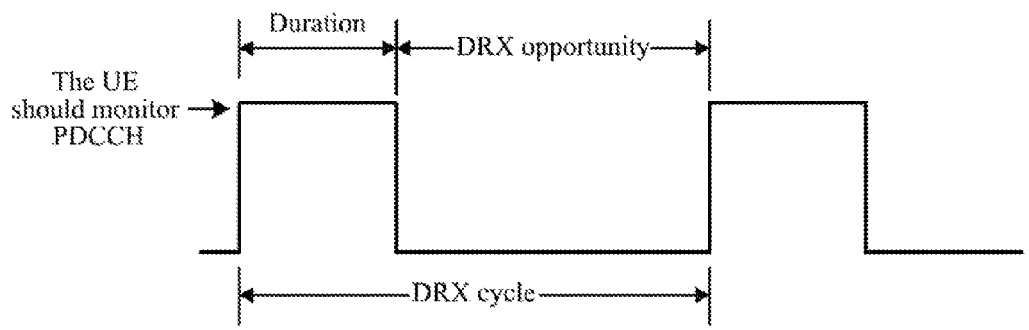
FIG. 1 illustrates the basic working principle of the DRX in the existing LTE system.
Figure 2:
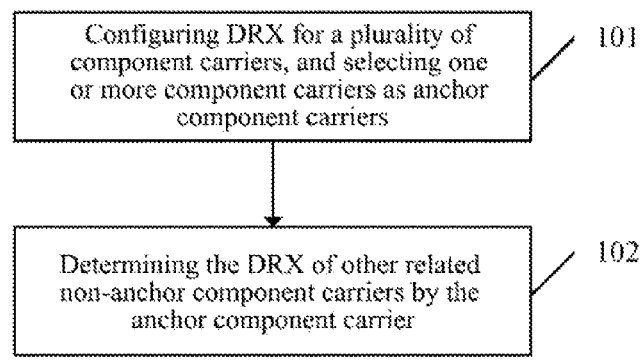
FIG. 2 illustrates the flow for implementing the method according to the present invention.

As shown in FIG. 2, a method for DRX comprises the following steps.

Step 101, DRX is configured for a plurality of component carriers, and one or more component carriers are selected as anchor component carriers.

Here, configuring DRX for a plurality of component carriers means configuring DRX for the anchor component carrier and non-anchor component carriers among the plurality of component carriers respectively.

Step 102, the DRX of other related non-anchor component carriers is determined by the anchor component carrier.

Furthermore, as for the state of the anchor component carrier, the anchor component carrier comprises DRX state, wherein, the DRX state comprises activity state and inactivity state. For the state of the non-anchor component carriers, the non-anchor component carriers comprise DRX state and dormant state; wherein, the DRX state also comprises activity state and inactivity state. The dormant state comprises de-activating state.

Furthermore, as for the type of cycle required to be supported by the DRX state, the DRX state of the anchor component carrier may support long DRX cycle. Optionally, the DRX state of the anchor component carrier and that of the non-anchor component carrier may support or not support short DRX cycle. As for the non-anchor component carriers, optionally, the non-anchor component carriers may be configured to support or not support long DRX cycle, and its DRX state thereof is determined to be in activity state or inactivity state according to a control signaling of the anchor component carrier. Wherein, when the DRX state of the anchor component carrier and that of the non-anchor component carriers are configured to support short DRX cycle, intermigration operation between the long DRX cycle and the short DRX cycle is supported.

Furthermore, as for the dormant state of the above non-anchor component carriers, the dormant state of the non-anchor component carriers means: closed state or de-activating state of the component carrier. The component carrier is able to enter the DRX state from the dormant state after being open or activated. The component carrier may be in active state or non-active state when entering the DRX state. The component carrier in the dormant state cannot be scheduled; the component carrier in the dormant state cannot be used for transmitting or receiving data.

Furthermore, as for the configuration relationship between the anchor component carrier and a cell, the anchor component carrier is associated with a serving cell or a primary serving cell in a RRC connection state.

Furthermore, as for the configuration relationship between the anchor component carrier and a UE, the anchor component carrier is specified for the UE, that is, the anchor component carrier corresponding to a certain UE may be a anchor component carrier or a non-anchor component carrier with respect to other additional UEs.

Furthermore, as for the configuration relationship between the anchor component carrier and a channel, the anchor component carrier serves as a backward compatible component carrier or a non-backward compatible component carrier, and needs to be configured with a PDCCH.

Furthermore, as for the configuration relationship between the non-anchor component carrier and a channel, the non-anchor component carriers serves as a backward compatible component carrier or a non-backward compatible component carrier or an extended component carrier, and may be configured or not configured with a PDCCH.

Wherein, as for the non-anchor component carrier that is not configured with PDCCH, its downlink resource assignment, or uplink grant is instructed using the PDCCH of the anchor component carrier or that of other non-anchor component carriers configured with PDCCHs.

Furthermore, as for the anchor component carrier controlling DRX of the non-anchor component carriers, the anchor component carrier controls DRX of the non-anchor component carriers through a control signaling or a preset condition; wherein, the control signaling is a media access control element (MAC CE) or a PDCCH signaling or a RRC signaling.

As for controlling DRX of the non-anchor component carriers through a control signaling or a preset condition, the controlling on DRX of the non-anchor component carriers through a control signaling by the anchor component carrier is further achieved by sending a control signaling from an enhanced Node B (eNB) to the non-anchor component carriers; or, the non-anchor component carriers determine DRX act of the current non-anchor component carrier according to the DRX configuration or DRX act of the anchor component carrier.

The control signaling may specifically be a media access control element (MAC CE) or a PDCCH signaling or a RRC signaling; the way of the non-anchor component carrier further receiving the control signaling of the eNB from the anchor component carrier is: receiving the control signaling through the PDCCH on the anchor component carrier, or the PDCCH configured for the current non-anchor component carrier, or the PDCCH configured for other non-anchor component carriers; or, receiving the control signaling through the MAC CE received by the anchor component carrier, or the MAC CE received by the current non-anchor component carrier.

As for the state migration triggered by the MAC CE transmitted by the eNB on the anchor component carrier, and in a scene where the state migration is intermigration between short DRX cycle and long DRX cycle, the anchor component carrier further notifies, through a MAC CE transmitted by the eNB, the current non-anchor component carrier to migrate from short DRX cycle to long DRX cycle; or the anchor component carrier further notifies, through a MAC CE transmitted by the eNB, the current non-anchor component carrier to migrate from long DRX cycle to short DRX cycle.

As for the state migration triggered by the MAC CE transmitted by the eNB on the non-anchor component carrier, and in a scene where the state migration is intermigration between short DRX cycle and long DRX cycle, the eNB further transmits a MAC CE in the non-anchor component carrier, and notifies the non-anchor component carrier to migrate from short DRX cycle to long DRX cycle; or, the eNB further transmits a MAC CE in the non-anchor component carrier, and notifying the current non-anchor component carrier to migrate from long DRX cycle to short DRX cycle. Or, the non-anchor component carrier migrates from long DRX cycle to short DRX cycle by starting a DRX inactivity timer when receiving or transmitting data of the present component carrier according to received downlink assignment or uplink grant instructed by the PDCCH of the anchor component carrier, and enters the short DRX cycle when the DRX inactivity timer times out.

When state migration is notified and triggered by the above two ways, namely, the MAC CE transmitted by the eNB on the anchor component carrier, or the MAC CE transmitted by the eNB on the non-anchor component carrier, the process of the non-anchor component carrier implementing intermigration between short DRX cycle and long DRX cycle further comprises: implementing intermigration between short DRX cycle and long DRX cycle through the MAC CE transmitted on the anchor component carrier or the current non-anchor component carrier; or the current non-anchor component carrier performing intermigration between short DRX cycle and long DRX cycle according to a preset condition. Wherein, the preset condition is activity status of a service, for example, data are not transmitted or received for a preset number of continuous durations on the component carrier, i.e., a preset number of continuous duration timers time out and the UE receive no downlink resource assignment or uplink grant as triggering condition during this period; or the preset condition is that the DRX short cycle timer on the anchor component carrier times out.

In a state migration scene where the state migration is from a DRX state to a dormant state, the non-anchor component carrier migrates from the DRX state to the dormant state according to the MAC CE transmitted on the anchor component carrier or the present non-anchor component carrier, or according to a PDCCH signaling transmitted on the anchor component carrier or the present non-anchor component carrier; or migrates from the DRX state to the dormant state according to a RRC de-activating signaling; or migrates from the DRX state to the dormant state according to a preset condition. Wherein, the preset condition is activity status of a service, for example, data are not transmitted or received for a preset number of continuous durations on the component carrier, i.e., a preset number of continuous duration timers time out and the UE does not receive downlink resource assignment or uplink grant as triggering condition during this period; or the preset condition is that the DRX short cycle timer on the anchor component carrier times out. It should be pointed out that when the component carrier migrates from the DRX state to the dormant state, the DRX state may be in activity state or inactivity state.

The non-anchor component carrier migrates from the dormant state to the DRX state according to a PDCCH signaling transmitted on the anchor component carrier.

When the non-anchor component carrier migrates from the dormant state to the DRX state, the DRX state may be in activity state or inactivity state, which is determined by the duration timer and the DRX initial offset value collectively.

When the anchor component carrier is in short DRX cycle, the non-anchor component carrier may further be in short DRX cycle or long DRX cycle or dormant state.

When the anchor component carrier is in long DRX cycle, the non-anchor component carrier may further be in long DRX cycle or dormant state.

Regarding MAC CE, MAC CEs of different uses are indicated by different logic channel identifiers respectively. Wherein, the MAC CE comprises: entering long DRX cycle, entering short DRX cycle, or entering dormant state.

Regarding the DRX configuration of the anchor component carrier, in view of the compatibility between a LTE-A system and a LTE system, the DRX configuration of the anchor component carrier comprises but not limited to, all DRX configurations in the current LTE system, including: timers and related parameters required by operation of the RRC configuring DRX of the anchor component carrier, including but not limited to: a duration timer; a DRX inactivity timer; a DRX retransmission timer, which is configured for each downlink HARQ (Hybrid Automatic Repeat Request) procedure except the downlink HARQ procedure specified for receiving the Broadcast Control Channel; long DRX cycle; a DRX initial offset value. Optionally, there are also a DRX short cycle timer and short DRX cycle. Each downlink HARQ procedure, except the downlink HARQ procedure specified for receiving the Broadcast Control Channel, is further configured with a HARQ RTT timer.

Regarding the DRX configuration of the non-anchor component carrier, also in view of the compatibility between a LTE-A system and a LTE system, the DRX configuration of the non-anchor component carrier comprises but not limited to, all DRX configurations in the current LTE system, including: timers and related parameters required by operation of the RRC configuring DRX of the anchor component carrier, including but not limited to: a duration timer; a DRX inactivity timer; a DRX retransmission timer, which is configured for each downlink HARQ (Hybrid Automatic Repeat Request) procedure except the downlink HARQ procedure specified for receiving the Broadcast Control Channel; long DRX cycle; a DRX initial offset value. Optionally, there are also a DRX short cycle timer and short DRX cycle. Each downlink HARQ procedure, except the downlink HARQ procedure specified for the receiving the Broadcast Control Channel, is further configured with a HARQ RTT timer.

Regarding the DRX configuration of the non-anchor component carrier, also in view of the compatibility between a LTE-A system and a LTE system, different from the above mentioned all DRX configurations, the DRX configuration of the non-anchor component carrier may further comprise but not limited to, part of DRX configurations in the LTE system, including but not limited to one or more of: a duration timer; a DRX inactivity timer; a DRX retransmission timer, which is configured for each downlink HARQ procedure except the downlink HARQ procedure specified for receiving the Broadcast Control Channel; long DRX cycle; a DRX initial offset value. Optionally, there are also a DRX short cycle timer and short DRX cycle. Each downlink HARQ procedure, except the downlink HARQ procedure specified for the receiving the Broadcast Control Channel, is further configured with a HARQ RTT timer.

Regarding the configuration relationship between the non-anchor component carrier and the timer, the non-anchor component carrier is only further configured with a standalone DRX inactivity timer, which is applied to the scene where only the standalone DRX inactivity timer is configured.

Wherein, in a case where the non-anchor component carrier is only configured with the standalone DRX inactivity timer, part or all of other DRX configurations conform to the DRX configuration of the anchor component carrier.

Regarding the configuration relationship between the non-anchor component carrier and the timer, the non-anchor component carrier is only configured with a standalone DRX inactivity timer and a duration timer, which is applied to the scene where both a standalone DRX inactivity timer and a duration timer are configured.

Wherein, in a case where the non-anchor component carrier is configured with both a standalone DRX inactivity timer and a duration timer, part or all of other DRX configurations conform to the DRX configuration of the anchor component carrier.

Regarding the configuration relationship between the non-anchor component carrier and the timer, in a case where the non-anchor component carrier is configured with the standalone DRX inactivity timer or duration timer, a value of the DRX inactivity timer or duration timer is smaller than, equal to, or greater than a value of the corresponding timer of the anchor component carrier.

Regarding the configuration relationship between the non-anchor component carrier and the timer, the non-anchor component carrier may be further configured with a DRX short cycle timer, and the migration scene between DRX cycles is controlled according to the timer.

Wherein, the above mentioned DRX inactivity timers configured for the anchor component carrier and each non-anchor component carrier are independently started or restarted according to the scheduling status of the present component carrier.

Wherein, in a case where the non-anchor component carrier is not further configured with the standalone DRX inactivity timer, when the DRX inactivity timer of the anchor component carrier is restarted, the non-anchor component carrier prolongs its time of active state correspondingly to be consistent with the anchor component carrier.

Wherein, in a case where the non-anchor component carrier is not further configured with the standalone duration timer, the non-anchor component carrier enters a DRX active state according to the PDCCH signaling of the anchor component carrier, and automatically enters a DRX non-active state or a dormant state when the DRX inactivity timer of the anchor component carrier times out.

Regarding the DRX configuration of the non-anchor component carrier, DRX configuration of each non-anchor component carrier keeps consistent or is independent from each other.

Furthermore, if each non-anchor component carrier is configured with a duration timer, a sub-frame where starting of the duration timer is located is aligned with the sub-frame where starting of the duration timer of the anchor component carrier is located.

Furthermore, when the non-anchor component carrier is not configured with a DRX short cycle timer, it can still support short DRX cycle and long DRX cycle as well as intermigration.

The DRX retransmission timer and HARQ RTT timer of the non-anchor component carrier are configured for each downlink HARQ procedure; the values of the corresponding timers are identical with or different from the values of the corresponding timers of the anchor component carrier.

As for the DRX act of the anchor component carrier, the DRX act of the anchor component carrier further needs to conform to the DRX act and principle in the LTE system—refer to the description in the Background Art; and may conform to other extended functions under the premise of being compatible with the DRX act and principle in the LTE system.

As for the DRX act of the non-anchor component carrier, the DRX act of the non-anchor component carrier further partially or fully conforms to the DRX act and principle in the LTE system, receives the control signaling of the anchor component carrier, and executes the corresponding DRX act according to the control signaling; or, identical DRX act is executed according to the DRX configuration and act of the anchor component carrier; or, a corresponding DRX act is executed according to a preset condition and according to the DRX configuration and act of the anchor component carrier, for example, automatically entering dormant state when the DRX short cycle timer of the anchor component carrier times out and enters long DRX cycle.

As for the interacting SR and SR response between the UE and the eNB, when transmitting a SR to the eNB, the UE transmits the SR on any component carrier configured with special physical uplink control channel (PUCCH) resources or only on the anchor component carrier.

As for the interacting SR and SR response between the UE and the eNB, when the eNB responds to the SR, it is limited that the uplink grant only be transmitted on the anchor component carrier; after the UE transmits the SR, the anchor component carrier further keeps in an active state at least until receiving uplink grant or a maximum number of times for transmitting the SR is reached; or, when the eNB responds to the SR, uplink grant may be transmitted on any component carrier in activity state; after the UE transmits the SR, all component carriers keep in an active state at least until receiving uplink grant or a maximum number of times for transmitting SR is reached.

The present invention will be described below with reference to examples.

Figure 3:
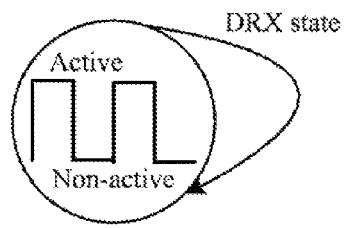
FIG. 3 illustrates the DRX state of the anchor component carrier in a LTE-A carrier aggregation system.
Figure 4:
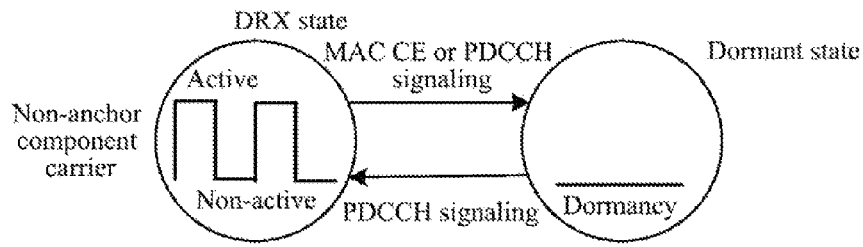
FIG. 4 illustrates the DRX state and state migration of the non-anchor component carrier in a LTE-A carrier aggregation system.

FIG. 3 and FIG. 4 illustrate the DRX state and migration of the anchor component carrier and the non-anchor component carrier in a LTE-A carrier aggregation system, which will described as follows.

The state of the anchor component carrier comprises a DRX state; wherein, the DRX state comprises active state and non-active state; if the anchor component carrier is configured to support short DRX cycle, then short DRX cycle and long DRX cycle as well as migration there between are supported. The DRX act of the anchor component carrier and various operations such as intra- and inter-DRX state migration, and migration between short DRX cycle and long DRX cycle are identical with the configuration and principle in the LTE system.

The state of the non-anchor component carrier comprises a DRX state and a dormant state; wherein, if the non-anchor component carrier is configured to support short DRX cycle, then short DRX cycle and long DRX cycle as well as migration there between are supported. The non-anchor component carrier is not configured, and is controlled to migrate from short DRX cycle to long DRX cycle or to dormant state according to the MAC CE or PDCCH signaling on the anchor component carrier or the present component carrier; to migrate from long DRX cycle to short DRX cycle according to the MAC CE or PDCCH signaling on the anchor component carrier or the present non-anchor component carrier; to migrate from dormant state to the DRX state according to the PDCCH signaling on the anchor component carrier. The non-anchor component carrier may also determines the migration between the short DRX cycle and long DRX cycle or migration from the DRX state to the dormant state according to an implicit rule, which may be also called as preset condition, for example, the service data scheduling status on the present component carrier; the non-anchor component carrier may be also configured to control the migration between short DRX cycle and long DRX cycle according to the same principle as the LTE system; the non-anchor component carrier may determine, within the DRX state, the state migration of the present component carrier completely according to the state migration status of the anchor component carrier so as to operate in exactly the same way as the DRX act of the anchor component carrier, but its migration from the DRX state to the dormant state needs to conform to the above mentioned principle, and there is no similar scheme in the LTE system.

Figure 5:
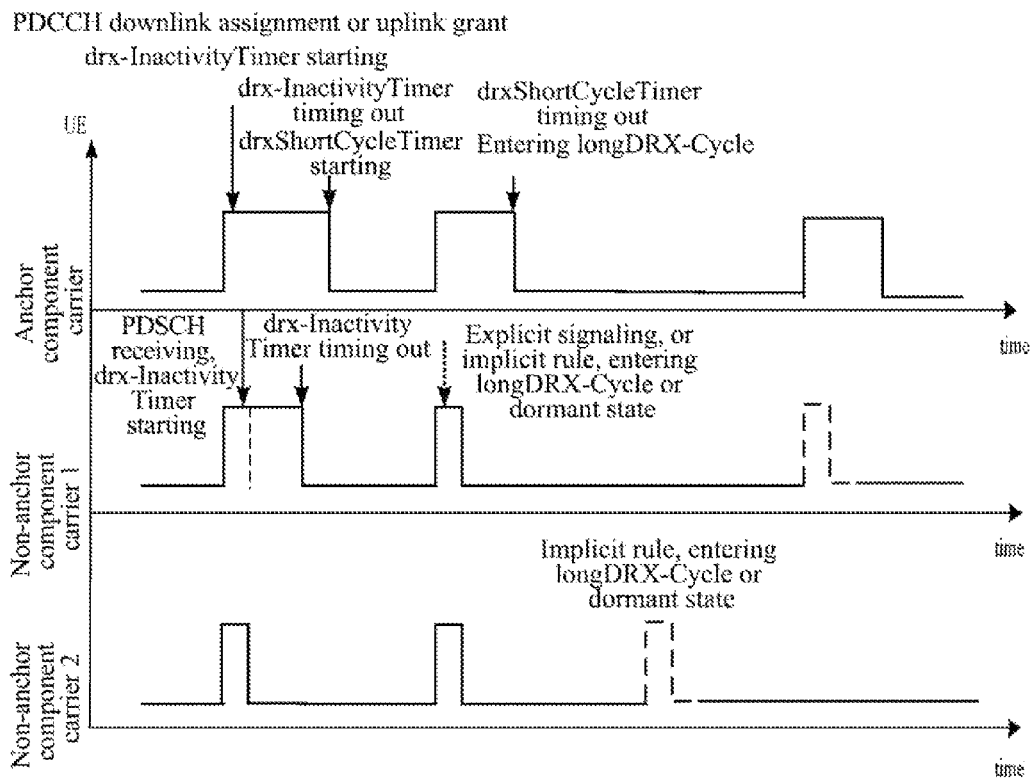
FIG. 5 illustrates the DRX configuration and DRX act scene of the anchor component carrier and the non-anchor component carrier in a LTE-A carrier aggregation system.

FIG. 5 illustrates one of the DRX configuration and DRX act scenes of the anchor component carrier and the non-anchor component carrier in a LTE-A carrier aggregation system, which will be described as follows.

The anchor component carrier is configured with the full set of the DRX configurations in the LTE system, and conforms to the DRX act identical with that in LTE system; and the DRX act of the non-anchor component carrier is controlled correspondingly.

The non-anchor component carrier 1 and non-anchor component carrier 2 are configured with a standalone duration timer and DRX inactivity timer respectively, and the values of these two timers are both smaller than the value of the corresponding timer of the anchor component carrier. The DRX inactivity timer is configured for each downlink HARQ procedure of the two non-anchor component carriers, and the values of the times are identical with that of the corresponding timer of the anchor component carrier. Neither of the two non-anchor component carriers is configured, and their DRX cycle migration operation is controlled by the anchor component carrier or is implemented according to an implicit rule.

For the non-anchor component carrier 1, upon receiving the first downlink resource assignment or uplink grant through the PDCCH of the anchor component carrier, the standalone DRX inactivity timer of the non-anchor component carrier 1 is started, and the short DRX cycle is automatically used after the DRX inactivity timer times out. The non-anchor component carrier 1 enters long DRX cycle or dormant state upon receiving the next signaling of entering long DRX cycle or dormant state transmitted by the eNB through the anchor component carrier, which may be a corresponding MAC CE or PDCCH signaling. Different control signaling is used for entering long DRX cycle or dormant state.

For the non-anchor component carrier 2, if two continuous scheduling signalings are not received, and there is no transmitting and receiving act of service data, the component carrier automatically enters long DRX cycle or dormant state according to a preset rule. Different implicit rules are used for entering long DRX cycle or dormant state.

It can be seen from the above description that the present invention provides a DRX scheme for carrier aggregation in a LTE-A system, and this scheme has advantages such as simple configuration and operation, good compatibility with the LTE system, and excellent performance of DRX power saving, etc.

A DRX configuration system, comprising a selecting and configuring unit, and a controlling unit; wherein, the selecting and configuring unit is used to configure DRX for a plurality of component carriers, and select one or more component carriers as a anchor component carrier; the controlling unit is used to control DRX of other related non-anchor component carriers through the anchor component carrier.

Here, the system further comprises: a state controlling unit, which is used to control a sate of the anchor component carrier, which specifically comprises DRX state; wherein, the DRX state comprises active state and non-active state. The state controlling unit is also used to control a state of the non-anchor component carrier, the state specifically comprising DRX state and dormant state; wherein, the DRX state comprises active state and non-active state; the dormant state comprises de-activating state.

Here, the system further comprises: a unit for configuring a relationship between the anchor component carrier and a cell, and a unit for configuring a relationship between the anchor component carrier and a UE. Wherein, the unit for configuring a relationship between the anchor component carrier and a cell is used to configure association between the anchor component carrier and a serving cell or a primary serving cell in a RRC connection state; the unit for configuring a relationship between the anchor component carrier and a UE is used to configure the anchor component carrier to correspond to the current UE; configure the anchor component carrier corresponding to the current UE to be a anchor component carrier or a non-anchor component carrier with respect to other UEs.

Here, the system further comprises: a unit for configuring a relationship between the anchor component carrier and a channel, and a unit for configuring a relationship between the non-anchor component carrier and a channel. Wherein, the unit for configuring a relationship between the anchor component carrier and a channel is used to configure PDCCH when the anchor component carrier serves as a backward compatible component carrier or a non-backward compatible component carrier; the unit for configuring a relationship between the non-anchor component carrier and a channel is used to configure or not configure PDCCH when the non-anchor component carrier serves as a backward compatible component carrier or a non-backward compatible component carrier or an extended component carrier.

Herein, the above mentioned radio resource control connection state may be indicated by RRC_CONNECTED; the duration timer may be indicated by on DurationTimer; the DRX inactivity timer may be indicated by drx-InactivityTimer; the DRX retransmission timer may be indicated by drx-RetransmissionTimer; long DRX cycle may be indicated by longDRX-Cycle; DRX initial offset may be indicated by drxStartOffset; DRX short cycle timer may be indicated by drxShortCycleTimer; short DRX cycle may be indicated by shortDRX-Cycle; HARQ RTT timer may be indicated by HARQ RTT timer; PDCCH sub-frame may be indicated by PDCCH-subframe; activity time may be indicated by Active Time; the media access control contention resolution timer may be indicated by mac-ContentionResolutionTimer; DRX cycle may be indicated by DRX Cycle; duration time may be indicated by On Duration; activity may be also indicated by active; inactivity may be indicated by inactive; soft buffer area may be indicated by soft buffer; measurement gap may be indicated by Measurement gap; Downlink assignment may be indicated by DL assignment; new transmission may be indicated by new transmission; component carrier may be indicated by Component Carrier; serving cell may be indicated by Serving cell; primary serving cell may be indicated by Primary serving cell; separately existing may be indicated by standalone; anchor carrier may be indicated by Anchor carrier; non anchor component carrier may be indicated by non anchor carrier; dormant may be indicated by Dormant; HARQ feedback may be indicated by HARQ feedback.

The above examples are only preferred examples of the present invention, and are not intended to limit the protection scope of the present invention.

What is claimed is:

1. A method for discontinuous reception (DRX), comprising:

configuring DRXs for a plurality of component carriers, and using one or more component carriers as an anchor component carrier; the anchor component carrier determining DRXs of other non-anchor component carriers;

wherein, the operation of the anchor component carrier determining DRX of the non-anchor component carriers comprises: the anchor component carrier determining DRX of the non-anchor component carriers through a control signaling or a preset condition;

wherein, the non-anchor component carriers determine DRX configuration or DRX act of the current non-anchor component carrier according to the DRX configuration or DRX act of the anchor component carrier;

wherein, the anchor component carrier achieves control on DRX of the non-anchor component carriers by sending a control signaling from an enhanced Node B (eNB) to the non-anchor component carriers;

wherein, the control signaling specifically comprises: a MAC CE or a PDCCH signaling or a RRC signaling; in a state migration scene of intermigration between short DRX cycle and long DRX cycle, the method further comprises: the eNB triggering the state migration in the MAC CE transmitted by the anchor component carrier, which specifically comprises: the anchor component carrier notifying, through the MAC CE transmitted by the eNB, the current non-anchor component carrier to migrate from short DRX cycle to long DRX cycle; or the anchor component carrier notifying, through the MAC CE transmitted by the eNB, the current non-anchor component carrier to migrate from long DRX cycle to short DRX cycle; or the non-anchor component carrier migrating from long DRX cycle to short DRX cycle by starting the DRX inactivity timer when receiving or transmitting data of the present component carrier according to received downlink assignment or uplink grant instructed by the PDCCH of the anchor component carrier, and entering the short DRX cycle when the DRX inactivity timer times out;

or the method further comprises: the eNB triggering the state migration in the MAC CE transmitted by the non-anchor component carrier, which specifically comprises: the eNB transmitting the MAC CE in the current non-anchor component carrier to notify the current non-anchor component carrier to migrate from short DRX cycle to long DRX cycle; or, the eNB transmitting the MAC CE in the current non-anchor component carrier, and notifying the current non-anchor component carrier to migrate from long DRX cycle to short DRX cycle.

2. The method according to claim 1, wherein, the anchor component carrier comprises DRX state, and the non-anchor component carriers comprise DRX state and dormant state;

the dormant state is: closed state or de-activating state of the component carrier; the DRX state may be entered after the component carrier is open or activated; the component carrier in the dormant state cannot be scheduled; the component carrier in the dormant state cannot be used for transmitting or receiving data.

3. The method according to claim 2, wherein, the DRX state of the anchor component carrier and the DRX state of the non-anchor component carrier both comprise activity state and non-activity state;

wherein, the DRX state of the anchor component carrier is configured to support long DRX cycle; the DRX state of the anchor component carrier is configured to support or not support short DRX cycle; the non-anchor component carriers are configured to: support or not support long DRX cycle, and when configured not to support long DRX cycle, the DRX state thereof is determined to be activity state or inactivity state according to a control signaling of the anchor component carrier; wherein, when the DRX state of the anchor component carrier and that of the non-anchor component carriers are configured to support short DRX cycle, intermigration operation between the long DRX cycle and the short DRX cycle is supported.

4. The method according to claim 1, wherein, when the anchor component carrier is in short DRX cycle, the non-anchor component carrier is in short DRX cycle or long DRX cycle or dormant state; when the anchor component carrier is in long DRX cycle, the non-anchor component carrier is in long DRX cycle or dormant state.

5. The method according to claim 1, wherein, the method further configures a timer of the non-anchor component carrier; the configuration specifically comprises: further not configuring the non-anchor component carrier with a standalone DRX inactivity timer; or, further not configuring the non-anchor component carrier with a standalone duration timer, wherein, in a case where the non-anchor component carrier is not configured with the standalone DRX inactivity timer, when the DRX inactivity timer of the anchor component carrier is started or restarted, the non-anchor component carrier prolongs its time of activity state correspondingly to be consistent with the anchor component carrier;

in a case where the non-anchor component carrier is not configured with the standalone duration timer, the non-anchor component carrier enters a DRX activity state according to the PDCCH signaling or starting of the duration timer of the anchor component carrier, and automatically enters a DRX inactivity state or a dormant state when the DRX inactivity timer of the anchor component carrier times out or the duration timer times out.

6. The method according to claim 1, wherein, DRX configuration of each non-anchor component carrier keeps consistent or is independent from each other; when each non-anchor component carrier is configured with a duration timer, a sub-frame where starting of the duration timer is located is aligned with the sub-frame where starting of the duration timer of the anchor component carrier is located.

7. The method according to claim 1, wherein, the DRX act of the anchor component carrier further needs to conform to the DRX act and principle in the LTE system, the DRX act of the non-anchor component carrier further partially or fully conforms to the DRX act and principle in the LTE system, receives the control signaling of the anchor component carrier, and executes the corresponding DRX act according to the control signaling; or, the non-anchor component carrier executes an identical DRX act according to the DRX configuration and act of the anchor component carrier; or, the non-anchor component carrier executes a corresponding DRX act according to a preset condition and according to the DRX configuration and act of the anchor component carrier.

8. The method according to claim 1, wherein, the method further comprises: configuring a relationship between the anchor component carrier and a channel, wherein, the configuration specifically comprises: the anchor component carrier serving as a backward compatible component carrier or a non-backward compatible component carrier, needing to be configured with a physical downlink control channel (PDCCH);

the configuration relationship between the non-anchor component carrier and a channel specifically comprises: the non-anchor component carriers serving as a backward compatible component carrier or a non-backward compatible component carrier or an extended component carrier, being or not configured with a PDCCH;

wherein, when a current non-anchor component carrier is not configured with a PDCCH, downlink resource assignment, or uplink grant of the current non-anchor component carrier which is not configured with a PDCCH is instructed through the PDCCH of the anchor component carrier or of other non-anchor component carriers configured with the PDCCH.

9. The method according to claim 1, wherein, the eNB notifying the current non-anchor component carrier to trigger state migration specifically comprises: the current non-anchor component carrier achieving intermigration between short DRX cycle and long DRX cycle according to the MAC CE transmitted on the anchor component carrier or the current non-anchor component carrier;

or the current non-anchor component carrier performing intermigration between short DRX cycle and long DRX cycle according to a preset condition; wherein, the preset condition specifically comprises: activity status of a service, or the DRX short cycle timer on the anchor component carrier times out.

10. A system for discontinuous reception configuration, comprising at least one processor adapted for configuring DRX for a plurality of component carriers, and select one or more component carriers as an anchor component carrier;

determining DRXs of other related non-anchor component carriers through the anchor component carrier;

wherein, determining DRXs of other related non-anchor component carriers through the anchor component carrier comprises: determining DRX of the non-anchor component carriers through a control signaling or a preset condition;

the at least one processor is also adapted for determining DRX configuration or DRX act of the current non-anchor component carrier according to the DRX configuration or DRX act of the anchor component carrier;

wherein, the anchor component carrier achieves control on DRX of the non-anchor component carriers by sending a control signaling from an enhanced Node B (eNB) to the non-anchor component carriers;

wherein, the control signaling specifically comprises: a MAC CE or a PDCCH signaling or a RRC signaling; in a state migration scene of intermigration between short DRX cycle and long DRX cycle, the at least one processor is also adapted for triggering the state migration by the MAC CE transmitted in the anchor component carrier by the eNB, which specifically comprises: the anchor component carrier notifying, through the MAC CE transmitted by the eNB, the current non-anchor component carrier to migrate from short DRX cycle to long DRX cycle; or the anchor component carrier notifying, through the MAC CE transmitted by the eNB, the current non-anchor component carrier to migrate from long DRX cycle to short DRX cycle; or the non-anchor component carrier migrating from long DRX cycle to short DRX cycle by starting the DRX inactivity timer when receiving or transmitting data of the present component carrier according to received downlink assignment or uplink grant instructed by the PDCCH of the anchor component carrier, and entering the short DRX cycle when the DRX inactivity timer times out;

or the at least one processor is also adapted for: triggering the state migration by the MAC CE transmitted in the non-anchor component carrier by the eNB, which specifically comprises: the eNB transmitting the MAC CE in the current non-anchor component carrier to notify the current non-anchor component carrier to migrate from short DRX cycle to long DRX cycle; or, the eNB transmitting the MAC CE in the current non-anchor component carrier, and notifying the current non-anchor component carrier to migrate from long DRX cycle to short DRX cycle.

11. The system according to claim 10, wherein, the at least one processor is also adapted for controlling state of the anchor component carrier and the non-anchor component carrier;

wherein, the state of the anchor component carrier specifically comprises DRX state, and the state of the non-anchor component carrier specifically comprises DRX state and dormant state;

the dormant state is: closed state or de-activating state of the component carrier; the component carrier being able to enter the DRX state after being open or activated; the component carrier in the dormant state cannot be scheduled; the component carrier in the dormant state cannot be used for transmitting or receiving data.

12. The system according to claim 10, wherein, the at least one processor is also adapted for configuring association between the anchor component carrier and a serving cell or a primary serving cell in a RRC connection state.

* * * * *